Figure 1:
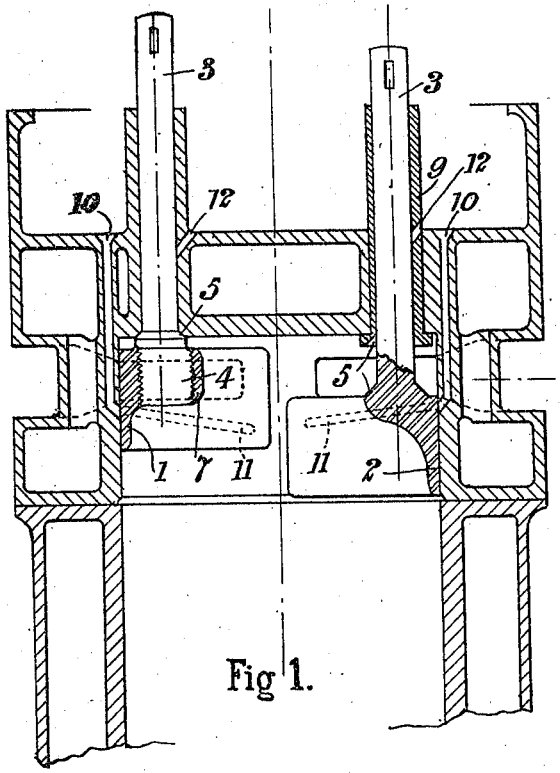

J. S. HOWARD.
VALVE MECHANISM FOR INTERNAL COMBUSTION ENGINES.
APPLICATION FILED DEC. 9, 1916.

1,292,783.

Patented Jan. 28, 1919.

Witnesses:
Dorothy Mary Howard
Jethro Marsha

Inventor:
John Stanley Howard

UNITED STATES PATENT OFFICE.

JOHN STANLEY HOWARD, OF BRISTOL, ENGLAND.

VALVE MECHANISM FOR INTERNAL-COMBUSTION ENGINES.

1,292,783.  Specification of Letters Patent.  Patented Jan. 28 1919.

Application filed December 9, 1916. Serial No. 135,999.

*To all whom it may concern:*

Be it known that I, JOHN STANLEY HOWARD, a subject of the King of Great Britain and Ireland, residing at Bristol, in England, have invented new and useful Improvements in Valve Mechanism for Internal-Combustion Engines, of which the following is a specification.

The main objects of this invention are:—

To remove the point of actuation from the region of the port passages.

To halve the reciprocating weight of a complete ring, permitting higher speeds.

To provide a simple and ready means of adjustment, to or from the working surface.

Also to seal the actuating valve rod from the effects of explosion, and against leakage during pressure periods.

According to this invention, in an internal combustion engine, working on a two or four stroke cycle, the valve member consists of a portion of a broad cylindrical ring, either more or less than half the circumference of the cylinder bore or housing, in which the valve slides, in a direction parallel to the axis of said cylinder or housing, above the piston, and is kept against its seating by the actuating rod. This housing forming the combustion chamber may be an extension of the cylinder bore. A feature of this invention consists in the method of operating such a valve member, which is not done through a slot in the cylinder wall, but through a hole in the cylinder head, in a direction parallel to the axis of the cylinder or valve housing. Another feature is that the valve actuating rod passes through said hole, and connects to a lug or projection on the inner curve of the valve member, and at a point approximating to the gravity and frictional centers of the valve, practically balancing the valve member on its rod.

It is obvious that some means must be provided to adjust such a valve to or from its seating, and this invention provides two methods of doing so, although not limited to such. Similar methods are known and described in a British Patent No. 20,437 of 1914. The rotation of an eccentrically bored bush or sleeve surrounding the valve rod, or the rotation of the valve rod itself, which is eccentrically attached to the valve member, gives the adjustment.

The valve member is sufficiently wide to cover the inlet or exhaust ports and give a good working surface. It may operate by one edge uncovering the port, or by ports cut through the valve member registering with similar ports in the cylinder wall also by a combination of both acting in unison when large port area is required. Leakage of pressure past the valve rod can be prevented at either the inner or outer end of the guide hole or bush, by arranging for a shoulder on the rod to seat against one end of the bush when the valve is in its closed position. If the valve is opened by an inward or downward movement, then the sealing valve would be at the inner end of the actuating valve rod. If an outward movement opens the valve, then the outer end of the bush would provide the sealing valve.

Valve actuation can be by any known means, such as the usual cam actuated tappet or lever, acting in both directions or in one direction with spring return.

Referring to the accompanying drawings, Figure 1 shows in section, the two methods of adjustment. The valve 1, has its actuating rod 3, eccentrically enlarged at 4, and seats at 5. The enlarged end of the valve rod 3 is shown screwed into the projecting boss 7 formed on the valve member 1, a set screw as 8 may be used to prevent the rod 3 turning after adjustment. The valve 2, Fig. 1, has its rod rigidly attached, the eccentric bush 9 by slight rotation in the valve housing gives the necessary adjustment.

Figure 2:
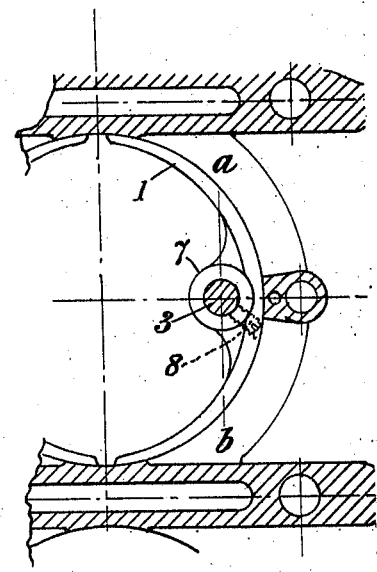

Fig. 2 is a plan of the valve, showing its neutral or balancing axis *a. b.*

At 10 are shown water cooled ducts through which lubricant is fed to the valve, the grooves 11 cut in the housing assist its distribution.

Lubrication of the valve rod is readily provided for in overhead cam-shaft engines by ducts 12 passing oil from the floor of the cam-shaft casing.

I claim:—

1. In an internal combustion engine, in combination, a power cylinder having a fluid passage opening in a segmental port within said cylinder at the head thereof, a segmental valve adapted to cover said port, a valve-rod passing into said cylinder at the head thereof parallel to the axis of and attached to said valve, eccentric means rotatable about the axis of said valve-rod for adjusting said valve toward and from said port, means for periodically sealing said valve-rod in its bearing, and means for reciprocating said valve-rod and said valve.

2. In an internal combustion engine, in combination, a power cylinder having a fluid passage opening in a segmental port within said cylinder at the head thereof, a segmental valve adapted to cover said port, a rotatable valve-rod passing into said cylinder at the head thereof parallel to the axis of and attached to said valve by means of an adjusting screw-end that is eccentric to said rod and means for reciprocating said valve-rod and said valve, substantially as described.

3. In an internal combustion engine, in combination, a power cylinder having a fluid passage opening in a segmental port within said cylinder at the head thereof, a segmental valve adapted to cover said port, a valve-rod passing into said cylinder at the head thereof parallel to the axis of and attached to said valve, a rotatable adjusting sleeve-bearing for said valve-rod having an exterior wall eccentric to its interior wall, a valve on said valve-rod for periodically sealing the said valve-rod in its sleeve-bearing and means for reciprocating said valve-rod and said valve, substantially as described.

4. In an internal combustion engine, in combination, a power cylinder having a fluid passage opening into a segmental port within said cylinder at the head thereof, a segmental valve adapted to cover said port, a valve-rod passing into said cylinder at the head thereof parallel to the axis of and attached to said valve, eccentric means rotatable about the axis of said valve-rod for adjusting said valve toward and from said port, an annular sealing means concentrically fixed on said valve-rod and adapted to fit a corresponding seating surrounding the inner end of the valve-rod bearing and means for reciprocating said valve-rod and said valve, substantially as described.

5. In an internal combustion engine, in combination, a power cylinder, a valve containing combustion chamber secured to said cylinder at the head thereof and having a fluid passage opening into a segmental port in said combustion chamber, a segmental valve adapted to cover said segmental port, a valve-rod passing into said combustion chamber parallel to the axis of said cylinder and attached to said valve, an eccentric means rotatable about the axis of said valve-rod for adjusting said valve toward and from said port, means for periodically sealing said valve-rod in its bearing and means for reciprocating said valve-rod and said valve, substantially as described.

6. In an internal combustion engine, in combination a power cylinder, a combustion chamber secured to said cylinder at the head thereof and having a fluid passage opening into a segmental port in a cylindrical wall of said chamber that is parallel to the bore of said cylinder, a segmental valve adapted to cover said port, a valve-rod passing into said combustion chamber parallel to the axis of and attached to said valve, a screw fixed eccentrically on said valve-rod for adjusting said valve toward and from said port, an annular conical sealing valve fixed concentrically on said valve rod and adapted to fit a corresponding seating surrounding the inner end of the valve-rod bearing and means for reciprocating said valve-rod and said valve, substantially as described.

7. In an internal combustion engine, in combination, a power cylinder, a combustion chamber secured to said cylinder at the head thereof and having a fluid passage opening into a segmental port in a cylindrical wall of said combustion chamber that is parallel to the bore of said cylinder, a segmental valve adapted to cover said port, a valve-rod passing into said combustion chamber parallel to the axis of and attached to said valve, a rotatable adjustable sleeve-bearing having an exterior wall eccentric to its interior wall, an annular conical collar on said valve-rod adapted to fit a corresponding seating surrounding the inner end of the interior wall of said sleeve-bearing and means for reciprocating said valve-rod and said valve, substantially as described.

JOHN STANLEY HOWARD.

Witnesses:
DOROTHY MARY HOWARD,
JETHRO MARSH.